United States Patent [19]

Boatwright

[11] Patent Number: 4,946,333
[45] Date of Patent: Aug. 7, 1990

[54] ASSEMBLY FOR MOVING AND GUIDING A VEHICLE ONTO AND OFF OF A BED OF A TOWING VEHICLE

[76] Inventor: Derrell W. Boatwright, Box 536, Leesville, S.C. 29070

[21] Appl. No.: 367,333

[22] Filed: Jun. 15, 1989

[51] Int. Cl.⁵ .............................................. B60P 3/00
[52] U.S. Cl. .................................... 414/559; 414/500; 414/494; 414/480; 254/327
[58] Field of Search ............... 414/477, 478, 479, 480, 414/491, 494, 500, 506, 538, 571, 539, 540, 559, 563; 254/323, 325–327, 328, 394, 398

[56] References Cited

U.S. PATENT DOCUMENTS

| | | | |
|---|---|---|---|
| 1,279,157 | 9/1918 | Rawson | 414/559 X |
| 1,457,947 | 6/1923 | Stanbrough | 254/327 X |
| 3,497,094 | 2/1970 | Conner et al. | 414/500 |
| 3,971,484 | 7/1976 | Anderson et al. | 414/559 |
| 4,062,461 | 12/1977 | Vincent | 414/559 X |
| 4,127,295 | 11/1978 | Robinson | 254/327 X |
| 4,770,592 | 9/1988 | Winter | 414/477 |

Primary Examiner—Frank E. Werner
Assistant Examiner—Keith L. Dixon
Attorney, Agent, or Firm—Terry M. Gernstein

[57] ABSTRACT

A control assembly for moving and guiding a vehicle onto and off of a bed of a towing vehicle includes a plurality of anchors affixed to the bed at various spaced apart locations and pin mounted pulleys releasably received in selected ones of those anchors. A cable from a winch that is located in the forward end of the bed is guided by the pulleys so that a vehicle can be moved onto or off of that bed using the most effective and efficient angles and directions of force that can be altered as necessary to meet the exact conditions encountered by the towing vehicle based on the orientation and position of the towing vehicle relative to the towed vehicle.

1 Claim, 3 Drawing Sheets

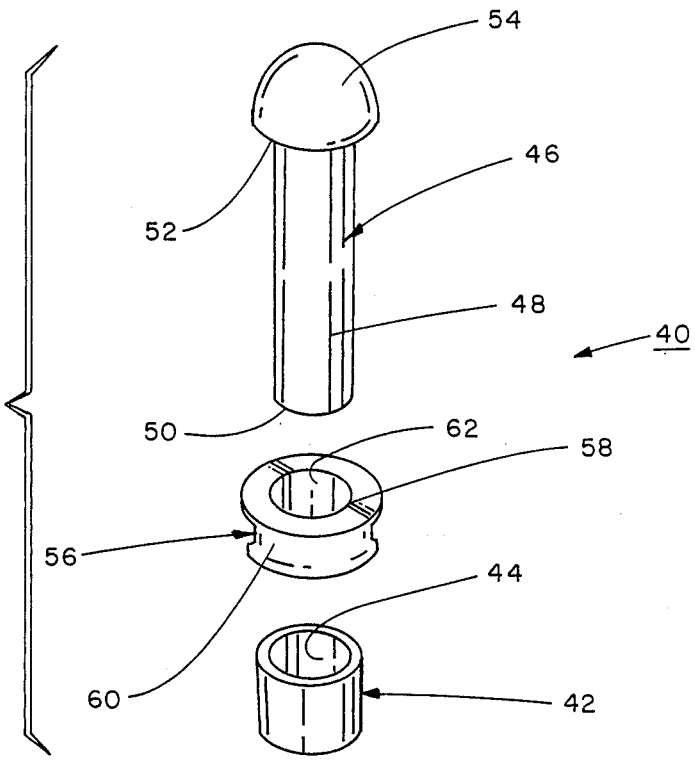
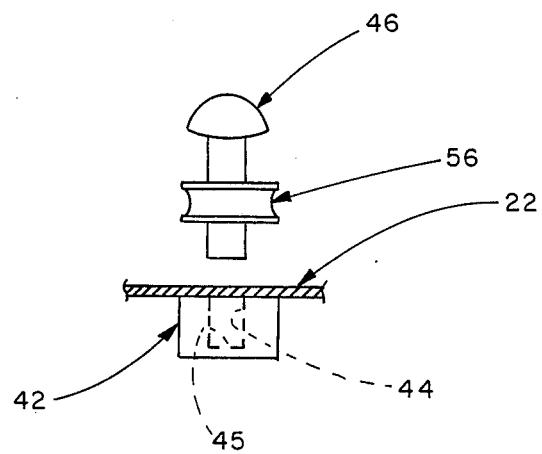
FIG. 4

ASSEMBLY FOR MOVING AND GUIDING A VEHICLE ONTO AND OFF OF A BED OF A TOWING VEHICLE

TECHNICAL FIELD OF THE INVENTION

The present invention relates to the general art of land vehicles, and to the particular field of towing vehicles.

BACKGROUND OF THE INVENTION

There are many instances in which a vehicle, such as an automobile, motor cycle, or the like, must be towed from one location to another. This towing can be accomplished using a boom and winch assembly by itself, or can be accomplished by moving the vehicle to be towed onto a bed of a towing vehicle. As used herein, the term towing vehicle will refer to a truck or other such vehicle that has a bed onto which the vehicle to be towed is moved.

To safely and efficiently move a towed vehicle onto a bed of a towing vehicle, the bed and the towed vehicle should be properly lined up. However, often the towed vehicle is in a position and/or orientation which makes it difficult to properly align this towed vehicle with the bed of the towing vehicle. Such a situation may occur, for example, if the towed vehicle has been in an accident and is off of the roadway. Such a vehicle is extremely difficult to move onto the bed of the towing vehicle. In extreme cases, a crane must be used to actually lift the vehicle onto the towing vehicle.

While there are winch assemblies which work to move an item onto the bed of another vehicle, there is no means for automatically aligning the item-moving assembly into a position that is most efficient for the loading process.

Accordingly, there is a need for a means for efficiently moving and guiding a towed vehicle onto and off of the bed of a towing vehicle.

Still further, there is no way of exactly and precisely predicting the relative orientation that will be established between the towed vehicle and the towing vehicle that will be used to move that towed vehicle onto the towing vehicle. That is, the towed vehicle might be in any number of positions and/or locations with respect to the roadway that will be available to the towing vehicle. Therefore, the possible relative orientation between the towing and the towed vehicles may vary greatly and unpredictably. Since the towing vehicle may be limited in the positions and orientations that it can assume, a situation may arise in which a towing vehicle arrives and cannot be used because it cannot efficiently move the towed vehicle onto the bed thereof.

Therefore, not only is there a need for the above-mentioned guiding means, this guiding means must be amenable to accommodating a wide variety of towed vehicle positions and/or orientations relative to the towing vehicle.

OBJECTS OF THE INVENTION

It is a main object of the present invention to provide a means for efficiently guiding a towed vehicle onto a bed of a towing vehicle.

It is another object of the present invention to provide a means for efficiently guiding a towed vehicle onto a bed of a towing vehicle which means is amenable to accommodating a wide variety of relative positions and/or orientations between the towed vehicle and the towing vehicle bed.

It is another object of the present invention to provide a means for efficiently guiding a towed vehicle onto a bed of a towing vehicle which means is amenable to accommodating a wide variety of relative positions and/or orientations between the towed vehicle and the towing vehicle bed and which is easily and efficiently adjusted to accommodate such varied positions and/or orientations.

SUMMARY OF THE INVENTION

These, and other, objects are achieved by a control means that includes a winch assembly on a towing vehicle bed and a cable guide means on the bed that is easily adjusted to guide the winch cable at various angles with respect to the towing vehicle bed. The guide means includes a plurality of anchors positioned in the bed at spaced apart locations and pulleys that can be attached to various ones of the anchors as necessary to change the angle of the winch cable with respect to the bed centerlines.

In this manner, the cable can be guided from the winch to the towed vehicle via the anchor-supported pulleys, with the pulleys being located to orient the cable in a manner that is most effective in pulling the vehicle onto or off of the towing vehicle bed for each of a wide variety of orientations and positions of the towed vehicle with respect to the bed of the towing vehicle.

The cable is moved into the most effective position and orientation by moving the pulleys from one anchor to another and using the set of anchors that is most effective for the particular situation at hand.

DESCRIPTION OF THE DRAWING FIGURES

FIG. 3 is an exploded perspective view of an anchor and pulley assembly of the present invention.

FIG. 4 is an elevational view of the anchor affixed to the bed of a towing vehicle and a pulley assembly about to be placed in such anchor.

DETAILED DESCRIPTION OF THE PREFERRED EMBODIMENT OF THE INVENTION

Figure 1:
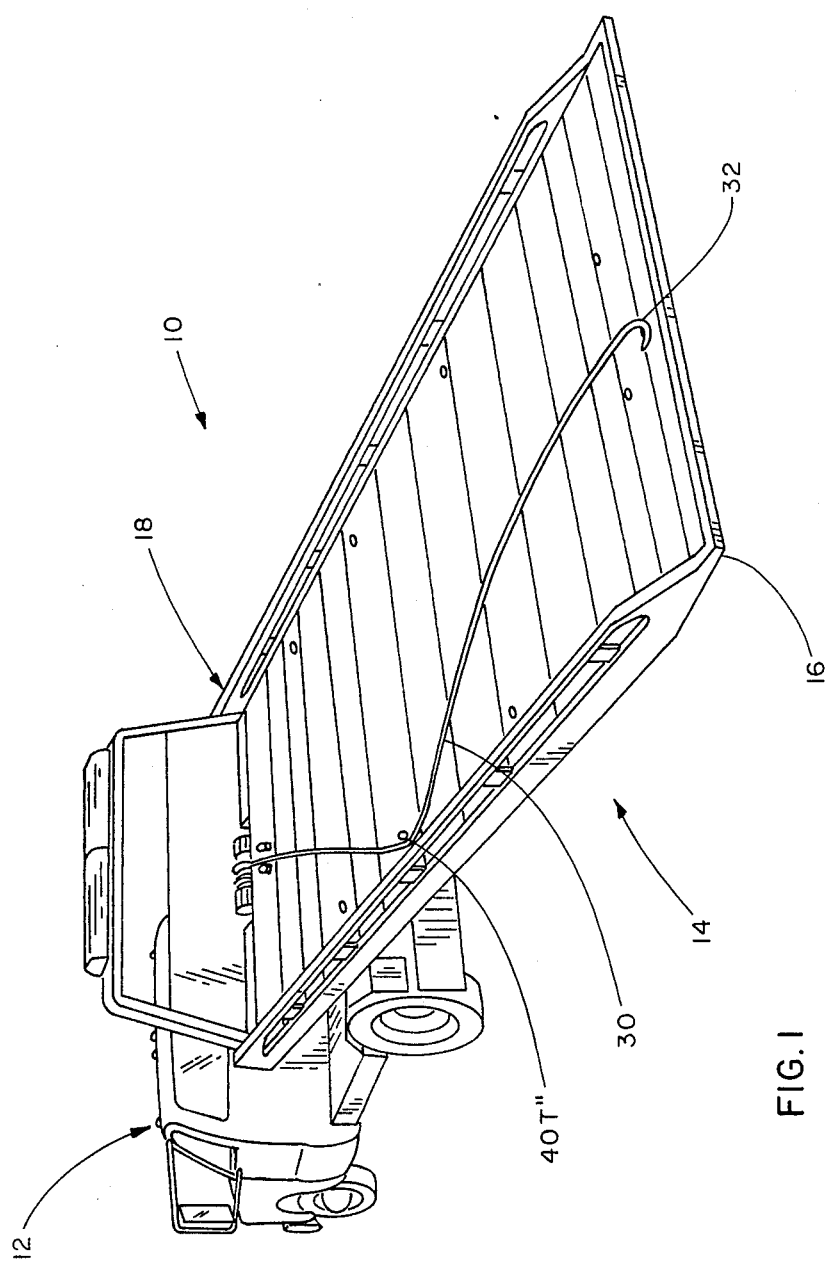
FIG. 1 is a perspective view of a towing vehicle and its bed having the guiding means embodying the present invention.

Shown in FIG. 1 is a truck assembly 10 that is used to move vehicles from one place to another. The truck assembly 10 will be hereinafter referred to as the towing vehicle, and includes a tractor 12 and a towing bed 14. A vehicle to be towed is moved onto the bed 14 via the aft end 16 of that bed, and the forward end 18 of the bed is connected to the tractor via a fifth wheel or other such connection means. In order to move the vehicle onto the bed in the most efficient manner, the bed 14 includes a control means for moving and guiding a vehicle onto the bed 14.

Figure 2:
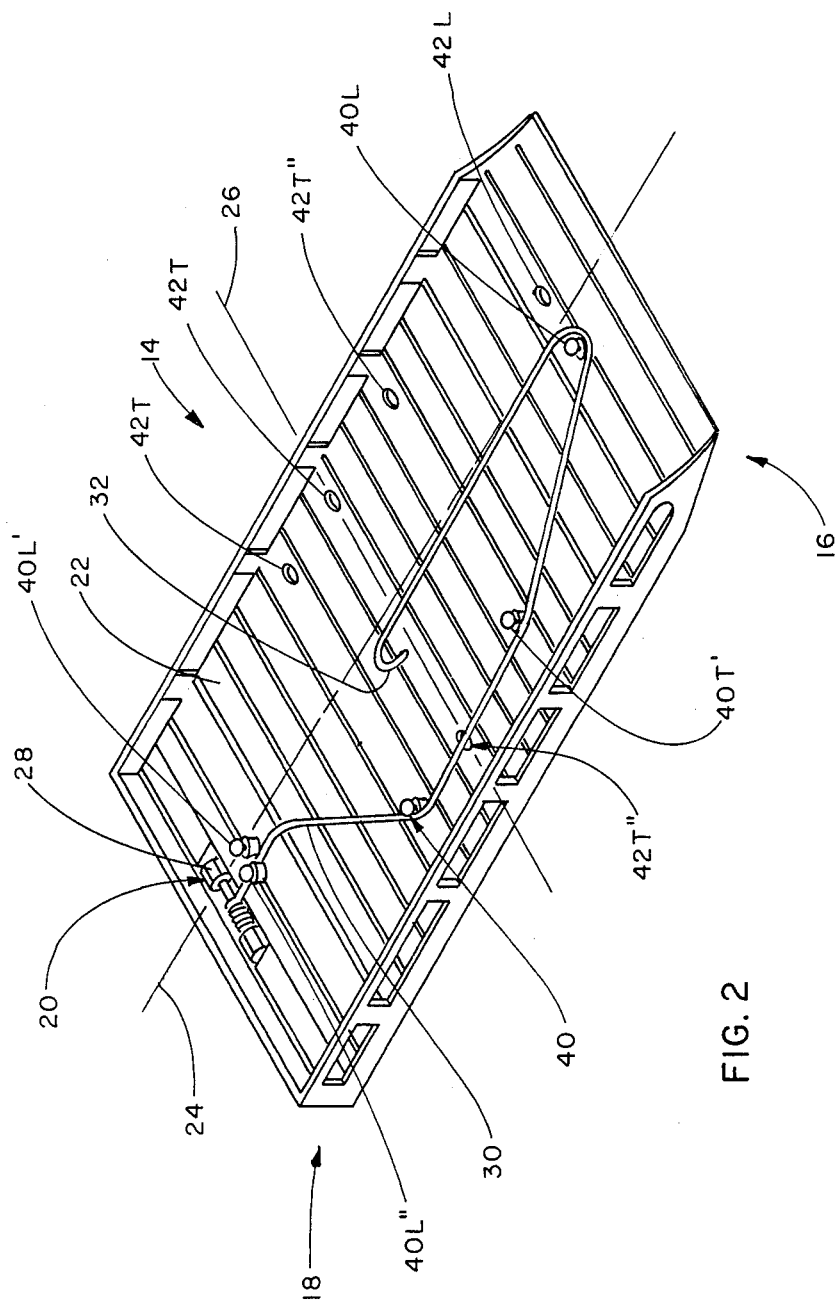
FIG. 2 is a perspective view of a bed of a towing vehicle having the guide means of the present invention.

As best shown in FIG. 2, the control means includes a winch assembly 20 located therein near the forward end 18, and the bed includes a plurality of slats, such as slat 22, that extend transversely of the longitudinal centerline 24 and parallel to the transverse centerline 26. The winch assembly 20 includes a motor-driven winding drum 28 driven by a motor (not shown), and around which a cable 30 is wound and unwound in a winching process. The cable has a towing hook 32 on a distal end thereof which is connected to the vehicle to be moved onto or off of the bed 14. The winch assembly operates in the manner usual to winches, and thus will not be further discussed.

The control means further includes a plurality of cable guide means 40 mounted on the bed for guiding the winch cable 30 at various angles with respect to the centerlines 24 and 26 as a towed vehicle is moved onto and off of the bed 14. The guide means are located at various positions on the bed as will be discussed below, and present a variety of control points for the cable. One of the combinations is shown in FIG. 2, and others will occur to those skilled in the art and are used as a towed vehicle is in a variety of positions and orientations with respect to the bed so that the cable will be able to exert the most effective force on the vehicle.

As best shown in FIGS. 3 and 4, each guide means 40 includes a tubular anchor 42 that has a central blind-ended bore 44 defined therein and having a bottom 45. The anchor is preferably steel, and is affixed, as by welding, to the slats 22 of the bed 14 to be located subadjacent to those slats.

Each guide means further includes a mounting pin 46 that is formed of steel or the like, and which includes a cylindrical body 48 having a bottom end 50 and a top end 52 on which a mushroom-shaped head 54 is located. The pin is sized so that when the bottom end 50 is seated against bottom 45 of the bore, some part of the body 48 extends above the upper surface of the slats for a purpose that will become evident from the ensuing disclosure.

The guide means further includes a pulley 56, which is also steel, and which includes an annular body 58 having a concave outer surface 60 and a central bore 62 that is sized to accommodate the pin body 48 and permit the pulley to rotated about such pin.

The guide means is assembled by placing the pin body through the pulley bore, and into the anchor bore, and seating the pin bottom 50 against the anchor bottom 45. The cable 30 is then trained around the pulley as indicated in FIG. 2 to be guided thereby.

The guide means anchors are strategically located about the bed 14 so that a variety of cable guiding locations is provided. By combining and selecting various anchors, the cable can be controlled in a suitable manner. The preferred embodiment includes more bed-mounted anchors than pins and pulleys; however there can be a pin and pulley in each anchor if desired. The pins are moved into the selected anchors as necessary, and can be withdrawn as necessary.

The anchors are located so that nearly all angles between the cable and the centerlines can be established. For example, the embodiment shown in FIG. 2 has the anchors on a hexagonal placement with anchors, such as anchor 42L located near the longitudinal centerline 24, and one anchor, such as anchor 42T located on or near the transverse centerline 26. The guide means can thus be paired as indicated with guide means, such as guide means 40L located adjacent to the anchor 42L with the longitudinal centerline 24 extending between the guide means 40L and the guide means associated with the anchor 42L. A similar arrangement of guide means 40L' and 40L" located at the forward end of the bed is provided.

Similarly, combinations of anchors, such as anchors 42T' and 42T", are shown as being Positioned on opposite sides of the transverse centerline 26, as are guide means 40T' and 40, with an anchor 42T" being positioned on the transverse centerline.

As can be seen in FIG. 2, the cable can be positioned between guide means 40L' and 40L", and then trained around guide means 40, 42T' and 40L while extending forwardly along the longitudinal centerline 24. Other combinations of guide means can be used as well without departing from the scope of the present invention, such as the combination shown in FIG. 1 using only guide means 40T" to guide the cable.

It is understood that while certain forms of the present invention have been illustrated and described herein, it is not to be limited to the specific forms or arrangements of parts described and shown.

I claim:

1. A control means for moving and guiding a towed vehicle onto and off of a towing vehicle comprising:
   (A) a towing vehicle bed which includes
      (1) a forward end which is located adjacent to a towing vehicle,
      (2) an aft end,
      (3) a longitudinal centerline extending from said forward end to said aft end,
      (4) sides,
      (5) a transverse centerline extending between said sides, and
      (6) a plurality of towed vehicle supporting slats, each slat extending parallel to said transverse centerline and having an upper surface on which the towed vehicle is supported and a lower surface, and a thickness measured between said slat upper surface and said slat lower surface;
   (B) a winch assembly mounted on said towing vehicle bed adjacent to said forward end and including a cable having a towing hook thereon; and
   (C) a cable guide means mounted on said towing vehicle bed for guiding the wench assembly cable as a vehicle being towed is moved onto and off of said vehicle bed using said winch assembly, said cable guide means including
      (1) a plurality of anchors fixedly mounted on the bed at spaced apart locations, each of said plurality of anchors including
         (a) a cylindrical body having a top and a bottom,
         (b) a blind-ended bore defined in said cylindrical body from said top,
         (c) a blind-ended bore depth measured from adjacent to said bottom to said anchor top,
         (d) means fixedly attaching said cylindrical body to one of said slats on a lower surface of such slat with said blind-ended bore facing upwards, and
         (e) each slat including an anchor-receiving hole defined therethrough which is in alignment with said upward facing blind-ended bore and defining a bottomed bore through said slat,
      said plurality of anchors including
         (a) a first anchor located on a first slat near the bed longitudinal centerline and near said bed aft end,
         (b) a second anchor located on said first slat adjacent to said first anchor with the bed longitudinal centerline being located between said first and second anchors,
         (c) a third anchor located on a second slat near the bed longitudinal centerline and near said bed forward end, (d) a fourth anchor located on said second slat near said third anchor with the bed longitudinal centerline being located between said third and fourth anchors, with said third and fourth anchors located closer to each other than said first and second anchors, (e) a fifth anchor located near the bed transverse centerline on a third slat and near one side of said bed, (f) a sixth anchor located near the bed transverse centerline on a fourth slat and near said bed one side with said bed transverse centerline being located between said fifth and sixth anchors, (2) a plurality of mounting pins, each mounting pin being associated with one of said anchors and including (a) a cylindrical body that is received in one of said bottomed holes through a slat and into a blind-ended bore which is aligned with such slat hole, (b) said cylindrical body being sized to slide into and out of said bottomed hole, (c) each cylindrical body including a bottom end which abuts the bottom of the anchor associated with such mounting pin, and a mushroom-shaped head on another end of said body and having a length which is defined between said bottom end and said head, (3) a plurality of cable guide pulleys, each cable guide pulley being associated with one of said mounting pins and each cable guide pulley including (a) a annular body, (b) a bore defined through said body, (c) a concave groove defined in an edge of said body, (d) each body being rotatably mounted on an associated one of said mounting pins to rotate about said mounting pin in a plane which is parallel to said bed slat upper surfaces, (e) a bottom surface slidably engaging an upper surface of a slat, (f) an upper surface, (g) a width defined between said guide pulley upper surface and said guide pulley bottom surface, and (4) each of said mounting pins having a length which is greater than the combined dimension of said anchor blind-ended bore depth plus said slat thickness plus said guide pulley width so that said guide pulleys rotate freely on associated ones of said mounting pins.

* * * * *